United States Patent [19]

Kiuchi et al.

[11] 4,286,858
[45] Sep. 1, 1981

[54] VOLTAGE DETECTING DEVICE FOR CAMERA

[75] Inventors: Masayoshi Kiuchi, Yokohama; Masaharu Kawamura, Kawasaki, both of Japan

[73] Assignee: Canon Kabushiki Kaisha, Tokyo, Japan

[21] Appl. No.: 159,493

[22] Filed: Jun. 16, 1980

[30] Foreign Application Priority Data

Jun. 15, 1979 [JP] Japan .................................. 54-75215

[51] Int. Cl.³ ...................... G03B 7/093; G03B 17/18
[52] U.S. Cl. .................................. 354/289; 354/23 D
[58] Field of Search ................ 354/23 D, 60 E, 60 L, 354/289, 53

[56] References Cited

U.S. PATENT DOCUMENTS 4,211,478  7/1980  Huber et al. ....................... 354/60 L
4,223,987  9/1980  Shimiju et al. ................. 354/60 E X Primary Examiner—Michael L. Gellner
Attorney, Agent, or Firm—Toren, McGeady and Stanger

[57] ABSTRACT

A voltage detecting device for a camera arranged to use an analog-to-digital converter of the camera in common. A signal representing the power source voltage of the camera to be detected is impressed on an integrator of the analog-to-digital converter. There is provided an annunciating means such as a light emitting diode or a sound emitting body which changes the condition of the output thereof alternately in accordance with charge and discharge of the integrator and has a span of output time in each of the output conditions corresponds to a span of charge time or a span of discharge time of the integrator.

12 Claims, 7 Drawing Figures

FIG.4
(a)
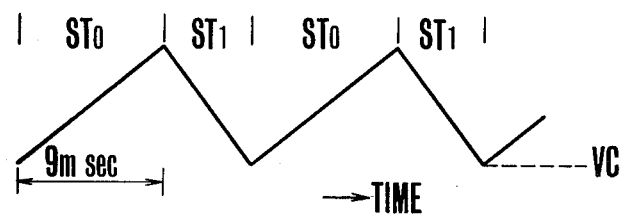
(b)
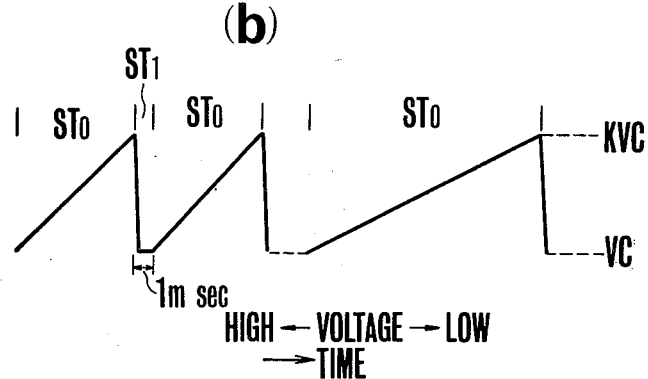
FIG.6
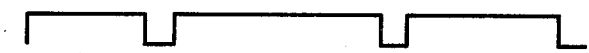

VOLTAGE DETECTING DEVICE FOR CAMERA

BACKGROUND OF THE INVENTION

1. Field of the Invention:

This invention relates to a voltage detecting device for a camera.

2. Description of the Prior Art:

It has been known to find the voltage condition of a power source through variation in the flickering period of an annunciator. The voltage detecting device of this type uses an integrator which performs integration in response to a battery check operation. When the output value of this integrator reaches a predetermined value, a comparator is actuated to make an annunciation and, at the same time, a discharge circuit is formed for the integrator. Then, the integrator resumes integration. The annunciator performs flickering with these actions repeated. The integrator of such a device comprises an operational amplifier and a selected capacitor connected to the input and output terminals of the operational amplifier. However, to permit adjustment of unevenness in accuracy, the capacitor cannot be disposed within an integrated circuit board and is thus mounted on the outside of the board. Accordingly, a voltage detecting device of this kind has been troublesome in respect of selection of a capacitor and mounting of it on the circuit board.

Meanwhile, some camera which has its exposure digitally controlled with analog exposure information converted into a digital value by an A-D converter has recently been developed. In the camera of this type, the A-D converter is provided with an integrator of a high degree of accuracy. This integrator is arranged also to have a capacitor selected and mounted on the outside of a circuit board. Therefore, the use of the above stated voltage detecting device for such a digital control camera has been even more troublesome in respect of selection of and mounting of the capacitor.

SUMMARY OF THE INVENTION

It is therefore an object of the invention to provide a voltage detecting device for a camera which can be easily manufactured and has a high degree of accuracy to solve the above stated problem.

It is another object of the invention to provide a voltage detecting device for a camera which is of simple structural arrangement.

These and further objects and features of the invention will become apparent from the following detailed description of embodiments thereof taken in connection with the accompanying drawings.

BRIEF DESCRIPTION OF THE DRAWINGS

FIGS. 4(a) –4(b) are an illustration of the wave form of the output of an operational amplifier A4 which forms the integrator of an A-D converter circuit shown in FIG. 2.

FIG. 6 shows other wave forms of the circuit.

DETAILED DESCRIPTION OF THE PREFERRED EMBODIMENTS

Figure 1:
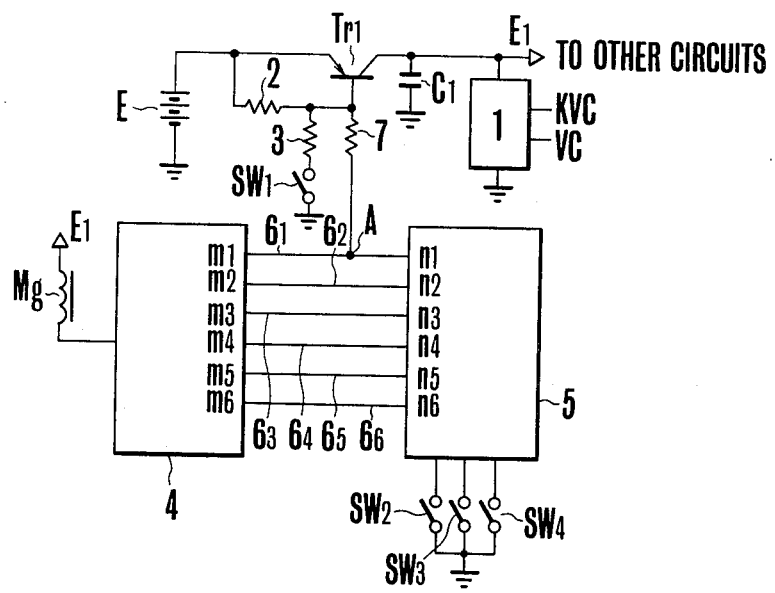
FIG. 1 is a circuit diagram showing a control circuit of a camera as an embodiment of the invention.

In FIG. 1, there is provided a power source battery E which is connected to a capacitor C1 and a constant voltage circuit 1 through a power supply control transistor Tr1. The constant voltage circuit is arranged to impress constant voltages Vc and KVc on other circuits. In addition to that, the battery E is arranged to supply voltage E1 to circuits through the transistor Tr1. A resistor 2 is connected between the base and emitter of the transistor Tr1. The base of the transistor Tr1 is grounded through a resistor 3 and a switch SW1 which is arranged to be closed by the first step of a depressing operation on a release button. An integrated circuit 4 forms a computating and control circuit and has a magnet Mg connected thereto. Another integrated circuit 5 forms a logic circuit. To this integrated circuit 5 are connected a switch SW2 which is arranged to be closed by the second step of a depressing operation on the release button; a switch SW3 which is arranged to open upon completion of winding; and another switch SW4 which is arranged to close during a battery check operation. The integrated circuits 4 and 5 are connected to each other by bus lines $6_1, 6_2, 6_3, 6_4, 6_5$ and $6_6$. The bus line $6_1$ is connected to the base of the transistor Tr1 through a resistor 7. Accordingly, the transistor Tr1 is arranged to turn on either when the switch SW1 is on or when the bus line $6_1$ is at a low level.

Figure 2:
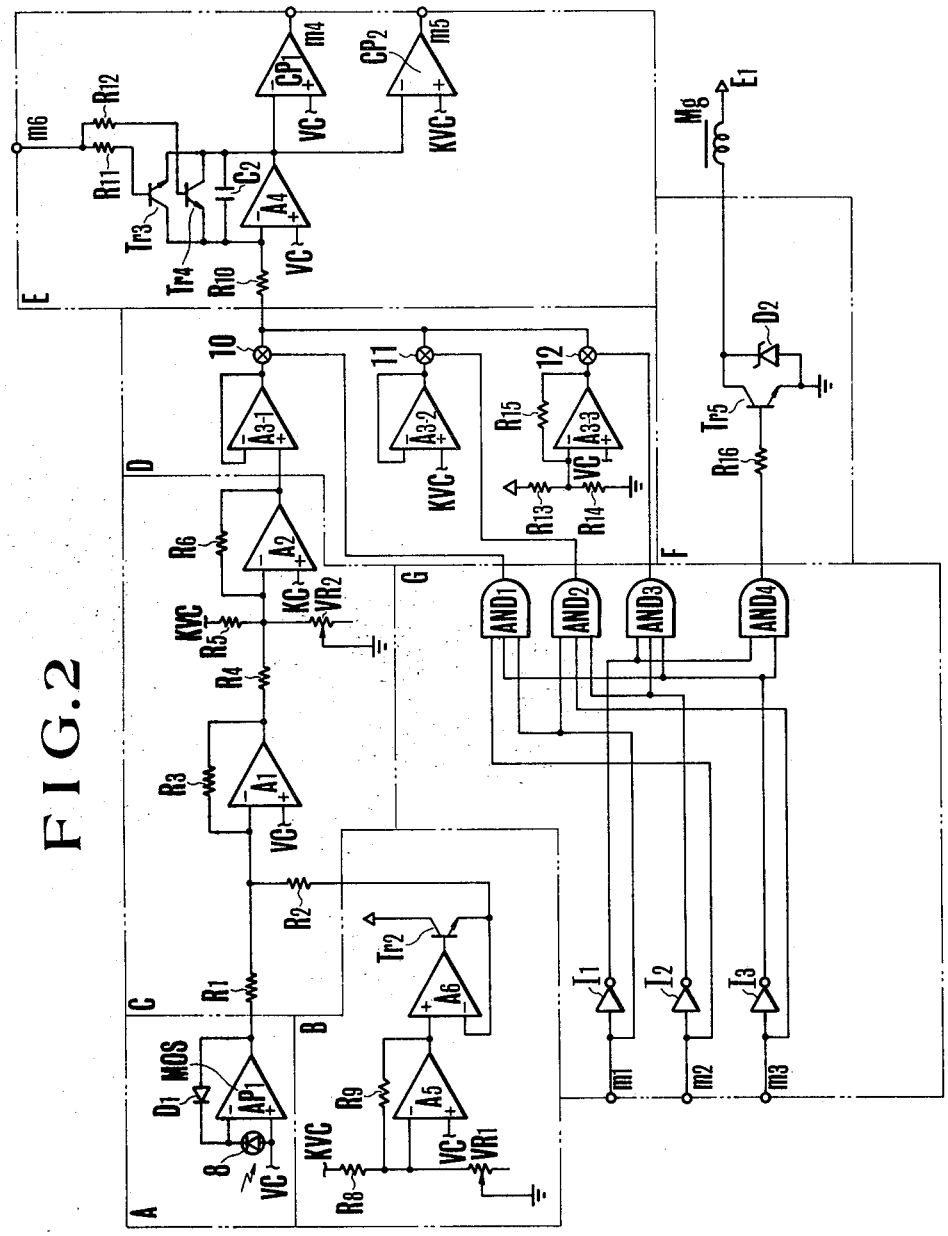
FIG. 2 is a circuit diagram showing the details of an integrated circuit which forms the computation and control circuit shown in FIG. 1.

In FIG. 2 which shows an integrated circuit which forms a computing and control circuit shown in FIG. 1, there is a light measuring circuit A which is provided with an MOS amplifier AP1 having a light sensitive element 8 and a logarithmic suppression diode D1 connected thereto. A block B represents a full-opening correcting information setting circuit which is provided with operational amplifiers A5 and A6 which are connected to each other. There are also provided a variable resistor VR1 which is interlocked with a full-opening signal pin and is connected to the operational amplifier A5 together with resistors R8 and R9; and a transistor Tr2. A block C represents an exposure computing circuit which comprises operational amplifiers A1 and A2, the operational amplifier A1 being arranged to have the outputs of the MOS amplifier AP1 and the operational amplifier A6 applied thereto through resistors R1 and R2. The output of the operational amplifier A1 is applied to the operational amplifier A2 through a resistor R4 while the operational amplifier A2 is arranged to receive shutter time information and film sensitivity information from a variable resistor VR2. Reference symbols R3, R4 and R5 indicate resistors. A block D represents a selection circuit which comprises operational amplifiers A3-1, A3-2 and A3-3 with analog switches 10, 11 and 12 respectively connected to these operational amplifiers. The operation amplifier A3-1 is arranged to have the output of the operational amplifier A2 applied thereto. The operational amplifier A3-2 is arranged to have the constant voltage KVc applied thereto. The operational amplifier A3-3 is arranged to have the divided voltage of resistors R13 and R14 applied to one input terminal thereof and the constant voltage Vc to the other input terminal thereof. A block E represents an A-D converter circuit including an operational amplifier A4 which is arranged to receive, through a resistor R10, a signal coming through analog switches 10, 11 and 12 which are formed, for example, by field effect type transistors and comparators CP1 and CP2 which are arranged to have the output of the amplifier A4 applied thereto. The amplifier A4 further has a capacitor C2 and transistors Tr3 and Tr4 connected thereto in parallel. The bases of the transistors Tr3 and Tr4 are connected to a terminal m6 through resistors R11 and R12. A block F represents a magnet control circuit which comprises a resistor R16, a transistor Tr5 and a diode D2. A block G represents a decoder which comprises inverters I1, I2 and I3 and AND gates AND1, AND2, AND3 and AND4. The inverters I1, I2 and I3 are connected to terminals m1, m2 and m3. The terminals m1, m2 and m3 and the inverters I1, I2 and I3 are selectively connected to the AND gates. The outputs of these AND gates AND1, AND2 and AND3 are arranged to be applied to the above stated analog switches 10, 11 and 12 while the output of the AND gate AND4 is arranged to be applied to the transistor Tr5 through the resistor R16.

Figure 3:
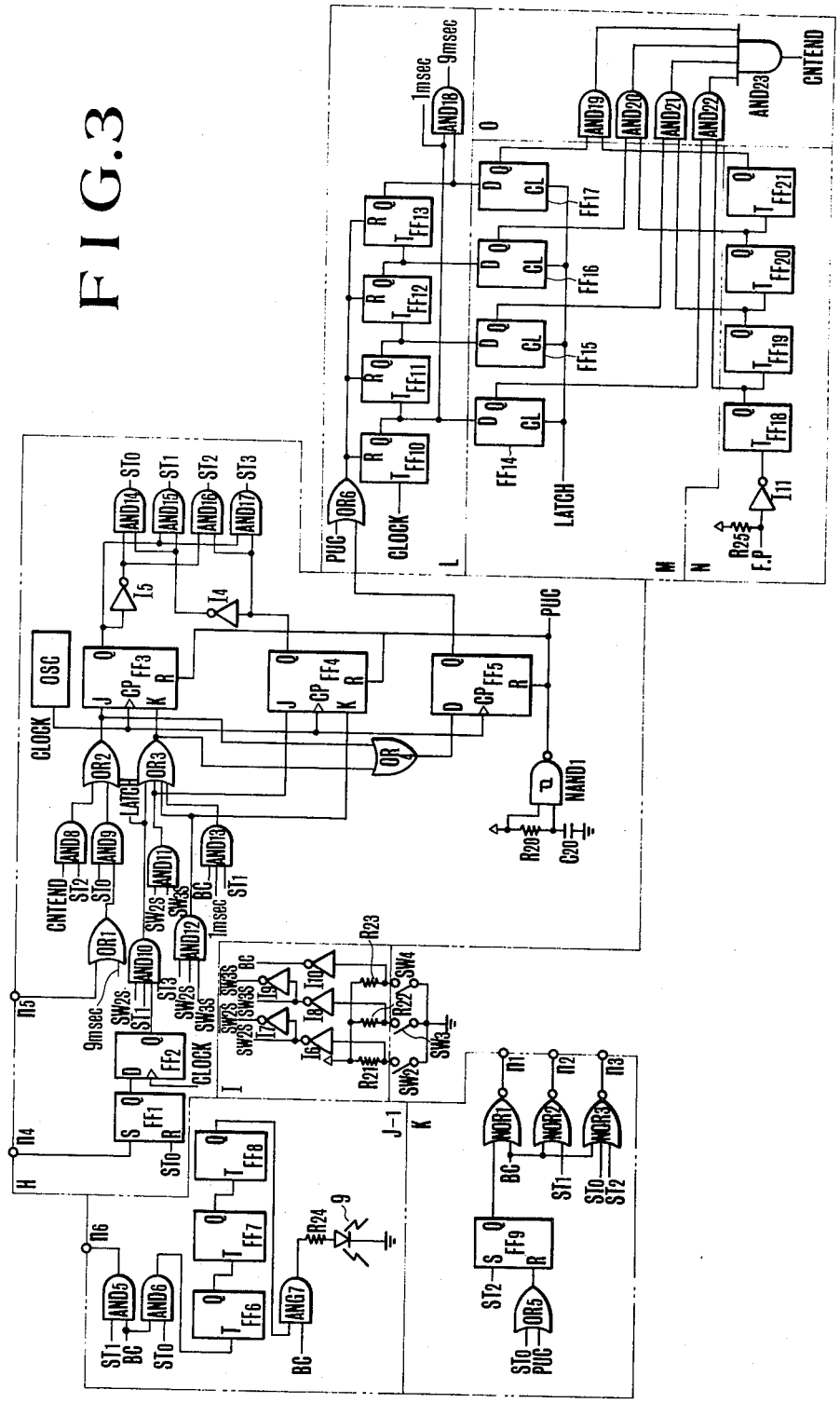
FIG. 3 is a circuit diagram showing the details of an integrated circuit which forms a logic circuit shown in FIG. 1.

In FIG. 3 which shows an integrated circuit 5 forming the logic circuit shown in FIG. 1, there is provided a status signal generating circuit H which comprises in combination: Flip-flop circuits FF1, FF2, FF3, FF4 and FF5; OR gates OR1, OR2, OR3 and OR4; inverters I5 and I6; AND gates AND8–AND17; a capacitor C20; and a pulse oscillator OSC. The AND gates AND14, AND15, AND16 and AND17 are arranged to produce status signals. A block I represents an interface circuit which comprises resistors R21, R22 and R23 and inverters I6–I10. The inverters I6, I8 and I10 are arranged to produce a signal $SW_{2s}$, a signal $SW_{3s}$ and a signal BC respectively while other inverters I7 and I9 are arranged to produce signals $\overline{SW_{2s}}$ and $\overline{SW_{3s}}$ respectively. A block J-1 represents a battery check annunciator circuit which comprises AND gates AND5–AND7; flip-flop circuits FF6–FF8; a resistor R24; and a light emitting diode 9. A block K represents an encoder which comprises an OR gate OR5; a flip-flop circuit FF9; and NOR gates NOR1, NOR2 and NOR3. A block L represents a counter which comprises an OR gate OR6; an AND gate AND12; and flip-flop circuits FF10, FF11, FF12 and FF13. A block M represents a register which comprises flip-flop circuits FF14, FF15, FF16 and FF17. A block N represents another counter which comprises a resistor R25; an inverter I11; and flip-flop circuits FF18–FF21. Another block O represents a detecting circuit which comprises AND gates AND19–AND23 and is arranged to produce a coincidence signal CNTEND when the output of the register M come to coincide with that of the counter N. The circuit arrangement described in the foregoing operates in the following manner:

When the switch SW1 is closed by depression of the release button, the transistor Tr1 is turned on to have a voltage E1 impressed on each circuit. This causes the MOS amplifier AP1 to produce a voltage which corresponds to the logarithmically suppressed output of the light sensitive element 8. Since the variable resistor VR1 is set in accordance with the full-open F number of the photograph taking lens, the full opening correction information is taken out from the operational amplifier A6 and the transistor provided there. Accordingly, the operational amplifier A1 computes the light measurement output of the light measuring circuit A and the above stated full-opening correction information. A correction output thus obtained is applied to the operational amplifier A2, which has the shutter time information and the film sensitivity information supplied thereto from the variable resistor V2. Then, the operational amplifier A2 computes these signals to produce an exposure signal therefrom.

On the other hand, in the logic circuit, when the transistor Tr1 is turned on to have the voltage E1 impressed on each circuit, the oscillator OSC produces oscillation pulses, for example, at 1 KHz. A current flows to the capacitor C20 through the resistor R20. When, the terminal voltage of the capacitor C20 reaches a predetermined value, the output of the NAND gate NAND1 changes from a high level to a low level. This causes the levels of the outputs of the flip-flop circuits FF2, FF4, FF5 and FF9 to become low and the level of the output of the AND gate AND14 to become high (ST0) and then the counter L begins to operate. The signal ST0 which is thus obtained is supplied to the OR gate OR5 to have the flip-flop circuit FF9 in a reset state. Further, the signal ST0 is supplied also to the NOR gate NOR3 to make the level of the output thereof low. Meanwhile, the levels of the NOR gates NOR1 and NOR2 are high respectively. Therefore, the outputs of the NOR gates NOR1, NOR2 and NOR3 are applied to the AND gates AND1, AND2, AND3 and AND4 through the terminals n1, n2 and n3, bus lines $6_1$, $6_2$ and $6_3$ and terminals m1, m2 and m3. The outputs of these NOR gates are further applied to the AND gates AND1, AND2, AND3 and AND4. This makes the level of the output of the AND gate AND1 high to turn on the analog switch 10. Accordingly, the output of the operational amplifier A2 is applied to the A-D converter circuit E through the amplifier A3-1 and the analog switch 10 and is subjected to integration there. However, when the level of the output of the AND gate AND18 becomes high after 9 milli-sec, the high level output of the AND gate AND18 is applied to the input terminal J of the flip-flop circuit FF3 through the OR gate OR1, the AND gate AND9 and the OR gate OR2. In this instance, when the clock pulses coming from the pulse oscillator OSC change from low to high the level of the output of the flip-flop circuit FF3 becomes high to make the level of the output of the AND gate AND14 low and that of the output of the AND gate AND15 high (ST1). Further, the output of the OR gate OR2 is supplied to the flip-flop circuit FF5 through the OR gate OR4. Then, the level of the output of the flip-flop circuit FF5 becomes high during the period of one clock to reset thereby the flip-flop circuits FF10, FF11, FF12 and FF13 of the counter L. When the level of the output of the AND gate AND15 becomes high (ST1), only the level of the output of the NOR gate NOR2 becomes low among the NOR gates NOR1, NOR2 and NOR3. This causes only the level of the output of the AND gate AND2 to become high to turn on the analog switch 11. As a result of this, the integrator of the A-D converter circuit E begins charging in the reverse direction to decrease its output. The level of the output of the comparator CP1 becomes high when the output of the integrator becomes lower than the voltage Vc. The output of the comparator CP1 is supplied to the input terminal S of the flip-flop circuit FF1 to make the level of the output of the flip-flop circuit FF1 high. Therefore, the level of the output of the flip-flop circuit FF2 becomes high at the time of rising of the clock pulse. Then, the level of the output of the AND gate AND10 becomes high (LATCH) and the register M comes to store the information of the counter L obtained immediately before the level of the output of the AND gate AND10 becomes high. Then, an analog stopping down signal is converted into a digital value by this. When the level of the output of the AND gate AND10 becomes high, a high level signal is applied to the input terminal K of the flip-flop circuit FF3 through the OR gate OR3 and the level of the output of the flip-flop circuit FF3 becomes low. Then, there obtains the original condition wherein the signal ST0 is produced. Therefore, the output of the operational amplifier A4 presents a wave form as shown in FIG. 4(a) with the signals ST0 and ST1 repeated. When the level of the output of either the AND gate AND14 or AND15 becomes high, if the switch SW2 is closed by further depressing the release button, the level of the output of the inverter I6 becomes high to make the level of the output of the AND gate AND11 high. This causes the high level output of the AND gate AND11 to be applied to the input terminal J of the flip-flop circuit FF4 and, concurrently with this, the high level output of the flip-flop circuit FF4 is also applied to the input terminal K of the flip-flop circuit FF3 through the OR gate OR3. Then, this causes the level of the output of the flip-flop circuit FF3 to become low to make the level of the output of the flip-flop circuit FF4 high. Therefore, the level of the output of the AND gate AND16 becomes high (ST2). The level of the output of the flip-flop circuit FF9 then becomes high and this high level output is retained until a signal PUC or ST0 is produced.

Therefore, the level of the output of the NOR gate NOR1 becomes low. Then, since the level of the bus line $6_1$ is low, voltage supply to each circuit continues until completion of the operation thereof even if the switch SW1 is turned off. Further, when the level of the output of the AND gate AND16 becomes high, the level of the output of the NOR gate NOR3 becomes low to make the levels of the output of the inverters I1 and I3 high and this in turn makes the level of the output of the AND gate AND4 high. With the level of the output of the AND gate AND4 becoming high, the transistor Tr5 is turned on to energize the magnet Mg. With the magnet Mg energized, a diaphragm is operated. In accordance with the operation of the diaphragm, a pulse signal is supplied from the terminal FP of the counter N to have the pulse signal counted by the counter N. The outputs of the flip-flop circuits FF18-FF21 and FF14-FF17 are supplied to the AND gates AND19-AND22 of the detecting circuit O. When their values come to coincide with each other, the levels of the outputs of the AND gates AND19-AND22 become high and then the level of the output of the AND gate AND23 also becomes high (CNTEND). The high level output of the AND gate AND23 is applied to the input terminal J of the flip-flop circuit FF3 through the AND gate AND8 and the OR gate OR2. This causes the level of the output of the flip-flop circuit FF3 to become high. Then, since the level of the output of the flip-flop circuit FF4 is also high, the level of the output of the AND gate AND17 becomes high. Since only the level of the output of the NOR gate NOR becomes low then, the levels of all of the outputs of the AND gates AND1-AND4 become low. The transistor Tr5 is thus turned off to deenergize the magnet Mg. Therefore, the diaphragm aperture is stopped down to a position coinciding with the A-D converted aperture value to effect control over the diaphragm aperture. Following this, upon completion of an exposure after the shutter is controlled, the switch SW3 is turned on to make the level of the output of the inverter I8 high ($SW_{3s}$). The level of the output of the AND gate AND12 then becomes high to allow the input terminals K of the flip-flop circuits FF3 and FF4 to have high level input applied thereto. The levels of the outputs of the flip-flop circuit FF3 and FF4 thus become low. Therefore, the level of the output of the AND gate AND14 become high (ST0) and again there obtains the original condition.

Next, the battery check operation is performed in the following manner:

When the switch SW4 is closed for checking the battery, the level of the output of the inverter I10 becomes high. Then, the levels of all of the outputs of NOR gates NOR1, NOR2 and NOR3 become low. The transistor Tr1 is turned on to have a voltage impressed on each circuit. As a result of this, the signal PUC makes the levels of the outputs of all of the flip-flop circuits FF3, FF4 and FF5 low while the level of the output of the AND gate AND14 becomes high (ST0). Further, since the levels of the outputs of the inverters I1, I2 and I3 then become high, the levels of the outputs of the AND gates AND3 and AND4 become high. This causes the transistor Tr5 to turn on to energize the magnet Mg. Concurrently with this, the analog switch 12 turns on to connect the operational amplifier A3-3 to the operational amplifier A4. Therefore, the integrator integrates the output of the operational amplifier A3-3 which corresponds to the voltage of the power source. When the output of the operational amplifier A4 comes to exceed the constant voltage KVc, the level of the output of the comparator CP2 becomes high. The high level output of the comparator CP2 is applied to the input terminal J of the flip-flop circuit FF3 through the OR gate OR1, the AND gate AND9 and the OR gate OR2. This makes the level of the output of the flip-flop circuit FF3 high. However, since the level of the output of the flip-flop circuit FF4 is low, the level of the output of the AND gate AND15 then becomes high (ST1). Following this, the level of the output of the AND gate AND5 becomes high to turn on the transistors Tr3 and Tr4. With the transistors turned on, the electric charge of the capacitor C2 of the integrator is forcedly discharged to cause the output of the operational amplifier A4 to become the constant voltage Vc. The level of the output of the AND gate AND15 becomes high to reset the counter L. After the lapse of one milli-second then, the level of the output of the flip-flop circuit FF10 becomes high. The high level output of the flip-flop circuit FF10 is applied to the input terminal K of the flip-flop circuit FF3 through the AND gate AND13 and the OR gate OR3 to make the level of the output of the flip-flop circuit FF3 low. This causes the level of the output of the AND gate AND14 to become high (ST0) and there again obtains the original condition. The output of the operational amplifier A4 comes to have a wave form as shown in FIG. 4(b) with the signals ST0 and ST1 alternately produced in a repeating manner. The length of time during which the signal ST0 is produced varies and the time of one cycle of the above stated operation varies with the condition of the power source voltage. The repetition of the signals ST0 and ST1 is frequency divided by the flip-flop circuits FF6, FF7 and FF8 of the annunciator circuit J-1. The frequency divided output thus obtained is then applied to the light emitting diode 9 through the AND gate AND7. Then, in accordance with the period of the frequency divided output, the light emitting diode 9 flickers. The condition of the battery E can be checked through the condition of this flickering. Since at this instance all loads are in operation, battery checking can be accomplished under an actual load condition.

Figure 5:
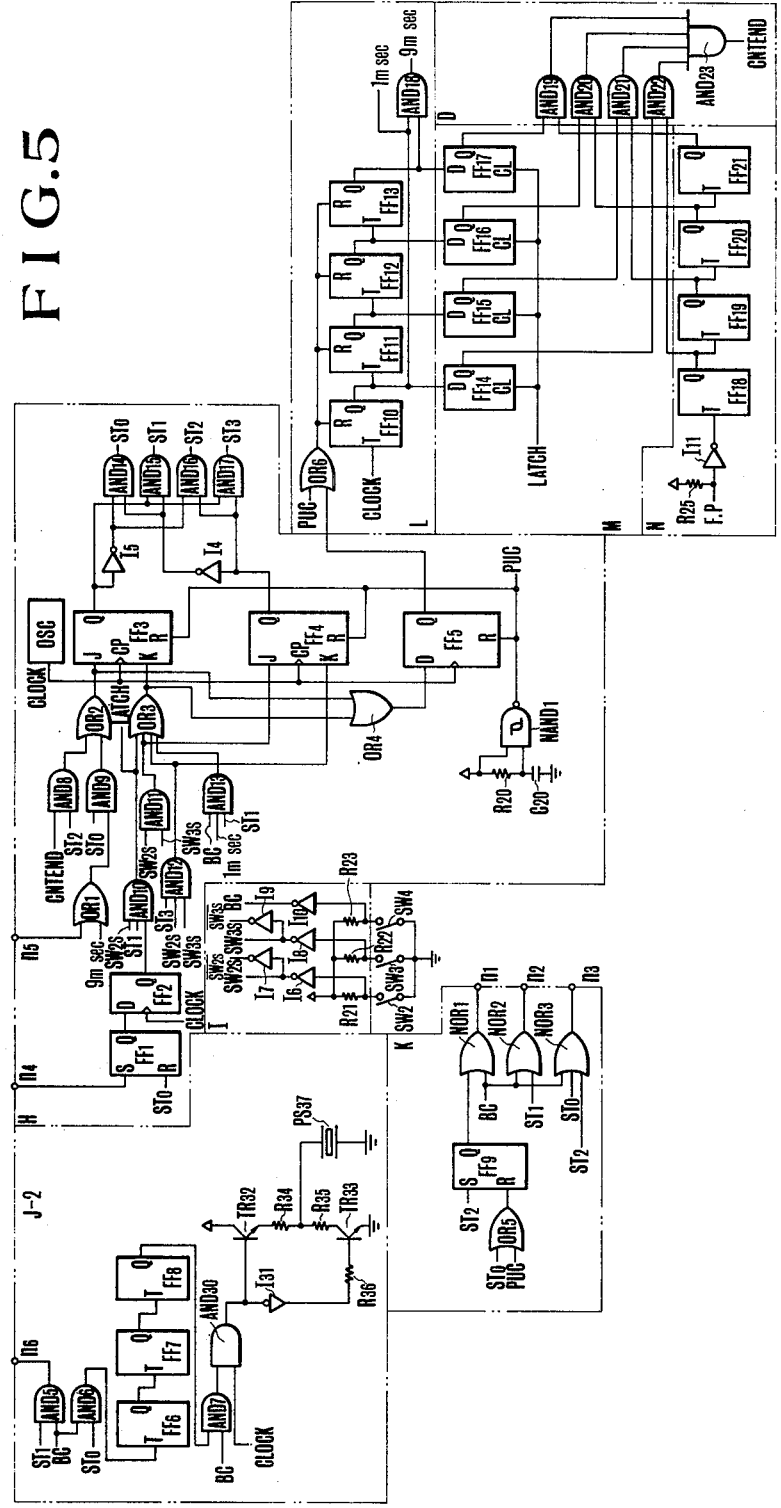
FIG. 5 is a circuit diagram showing the electrical circuitry of a camera as another embodiment of the invention and particularly the details of an integrated circuit forming the logic circuit thereof.

In a second example of embodiment of the invention which is shown in FIG. 5 and FIG. 6, a sound emitting body which produces an audible signal is employed as annunciating means in place of the light emitting diode 9 which is arranged to produce the visible signal.

In FIG. 5 which is a detailed logic circuit diagram corresponding to the logic circuit 5 of the first embodiment example, a block J-2 represents a battery check annunciator circuit comprising: AND gates AND5, AND6 and AND7 which are the same ones shown in FIG. 3 of the first embodiment; flip-flop circuits FF6, FF7 and FF8 which are also shown in FIG 3; an AND gate AND30; npn transistors TR32 and TR33; an inverter I31 having an output terminal connected to the base of the above stated transistor TR33 through a resistor R36; resistors R34 and R35 connected in series with each other; and a sound emitting body PS37 formed by a piezoelectric element. The sound emitting body PS37 is connected to the emitter of the above stated transistor TR32 through the resistor R34.

Other circuits of the second embodiment, such as a constant voltage circuit, a computing and control circuit, counters, etc., are arranged in the same manner as the constant voltage circuit 1, the computing and control circuit 4, the counters L and N, etc. of the first embodiment. Therefore, these circuits are omitted from description here. Referring now to FIG. 6, the second embodiment which is arranged as described in the foregoing operates in the following manner:

When the switch SW4 is closed to check the condition of the output of the power source battery E (see FIG. 1), the level of the output of the inverter I10 becomes high to turn on the analog switch 12 to have the integrator integrate the output of the operational amplifier A3-3 corresponding to the voltage of the power source in the same manner as in the case of the first embodiment. Following this, the signals ST0 and ST1 are alternately produced through the same operation as in the case of the first embodiment. Therefore, the AND gate AND7 shown in FIG. 5 produces an output as represented by AND7 OUT in FIG. 6. When the AND gate AND7 is opened by a frequency dependent on the output condition of the power source battery E, the AND gate AND30 produces an output signal which is in association with the oscillation frequency produced from the AND gate 7 and the oscillator OSC as represented by AND30 OUT in FIG. 6. This output signal drives the sound emitting body PS37 through the transistor TR32 and the resistor R34. Then, the sound emitting body PS37 produces an intermittent sound corresponding to the output condition of the power source battery E. Further, the inverter I31, the resistors R35 and R36 and the transistor TR33 are arranged to discharge the electric charge stored at the sound emitting body PS37.

In the second embodiment, a piezoelectric element is employed as the sound emitting body. However, it goes without saying that, in place of the piezoelectric element, a speaker, a bell, a buzzer, or the like may be used to obtain the same effect.

As described in detail in the foregoing, in accordance with the present invention, a battery checking operation can be performed with a high degree of accuracy by utilizing the integrator of the A-D converter which is provided for converting analog exposure information into a digital value. Further, with the integrator of the A-D converter used in common, the number of capacitors that are to be mounted on the outside of the circuit board decreases, so that the process and cost of manufacture can be simplified and lessened. Besides, another advantage of the invention lies in that, with the above stated A-D converter utilized as battery checking element, accurate battery check can be performed with an actual load condition taken into account.

What is claimed is:

1. A voltage detecting device for a camera provided with an analog-to-digital converter arranged to convert photographic information in an analog form into photographic information in a digital form and with a driving power source, comprising:
   (a) switching means for applying the output of said driving power source to the integrator of said analog-to-digital converter in such a manner that the output of said driving power source is integrated by said integrator, said switching means being arranged to operatively connect the output terminal of said power source to the input terminal of said analog-to-digital converter in response to an operation performed for the purpose of detecting the output of said driving power source;
   (b) discharge means for discharging an electric charge stored at said integrator down to a predetermined value when the level of the output of said integrator reaches a predetermined value;
   (c) control means functionally connected to said analog-to-digital converter for causing the integrating and discharging actions of said integrator to be periodically repeated;
   (d) annunciating means; and
   (e) output condition changing means for changing the output condition of said annunciating means in accordance with the integrating time and the discharging time of said integrator.

2. A voltage detecting device according to claim 1, wherein said switching means consists of an analog switch interposed between the output terminal of said power source and the input terminal of said analog-to-digital converter.

3. A voltage detecting device according to claim 1, further comprising:
   a manually operatable switch connected to said switching means to render said switching means operative in response to an operation performed for detecting the output of said driving power source.

4. A voltage detecting device according to claim 3, wherein said switching means consists of an analog switch responsive to the operation of said manually operatable switch and interposed between the output terminal of said power source and the input terminal of said analog-to-digital converter.

5. A voltage detecting device according to claim 1, wherein said integrator consists of a capacitor.

6. A voltage detecting device according to claim 5, wherein said discharge means includes a short circuit element connected said capacitor.

7. A voltage detecting device according to claim 1, wherein said discharge means includes a comparator connected to the output terminal of said analog-to-digital converter and which produces a control signal when the output level of said integrator has reached the predetermined value.

8. A voltage detecting device according to claim 6, wherein said control means includes a time forming element which renders the short circuit element operative.

9. A voltage detecting device according to claim 8, wherein said time forming element consists of a counter operatively connected to said short circuit element.

10. A voltage detecting device according to claim 1, wherein said annunciating means is formed by a light emitting diode which produces a visible signal.

11. A voltage detecting device according to claim 1, wherein said annunciating means is formed by a sound emitting body which produces an audible signal.

12. A voltage detecting device for a camera provided with an analog-to-digital converter which converts photographic information in an analog form into photographic information in a digital form and with a driving power source, the voltage of which is to be detected, said voltage detecting device comprising:

(a) switching means operatively connected between said driving power source and said analog-to-digital converter for applying the output of said power source to the input terminal of said analog-to-digital converter;

(b) control means connected to said analog-to-digital converter, said control means being arranged to cause said analog-to-digital converter to repeat charging and discharging actions at a span of time corresponding to the level of the output of said power source;

(c) annunciating means; and (d) changing means which is responsive to a charging time span and a discharging time span of said analog-to-digital converter and is arranged to alternately change the output of said annunciating means from one state to another state in response to the charging and discharging actions of said analog-to-digital converter.

* * * * *